(12) United States Patent
Montgomery

(10) Patent No.: US 10,757,274 B2
(45) Date of Patent: Aug. 25, 2020

(54) DOCUMENT IMAGING SYSTEM AND METHOD FOR IMAGING DOCUMENTS

(71) Applicant: Opex Corporation, Moorestown, NJ (US)

(72) Inventor: Robert Montgomery, Moorestown, NJ (US)

(73) Assignee: OPEX Corporation, Moorestown, NJ (US)

(*) Notice: Subject to any disclaimer, the term of this patent is extended or adjusted under 35 U.S.C. 154(b) by 0 days.

(21) Appl. No.: 16/285,075

(22) Filed: Feb. 25, 2019

(65) Prior Publication Data

US 2019/0268479 A1 Aug. 29, 2019

Related U.S. Application Data

(60) Provisional application No. 62/634,723, filed on Feb. 23, 2018.

(51) Int. Cl.
*H04N 1/00* (2006.01)
*H04N 1/17* (2006.01)
(Continued)

(52) U.S. Cl.
CPC ............ *H04N 1/0032* (2013.01); *B07C 3/06* (2013.01); *B07C 3/08* (2013.01); *B07C 3/14* (2013.01);
(Continued)

(58) Field of Classification Search
CPC .... G03G 15/23; G03G 15/60; G03G 15/6538; G03G 2215/00185; Y10S 271/902; G03B 27/6257; B07C 3/00; B07C 3/06; G06K 9/033; G06K 9/00442; G06K 9/186

USPC ......... 270/52.01, 52.02, 58.02, 52.14, 52.16, 270/52.29, 58.01, 58.04; 271/264; 209/3, 3.3, 584; 700/224; 382/101, 124
See application file for complete search history.

(56) References Cited

U.S. PATENT DOCUMENTS

| | | | |
|---|---|---|---|
| 2,613,789 | A | 10/1952 | McLaughlin |
| 2,877,048 | A | 3/1959 | Burt |

(Continued)

FOREIGN PATENT DOCUMENTS

| | | |
|---|---|---|
| WO | 2004111780 | 12/2004 |
| WO | 2016179480 | 11/2016 |

OTHER PUBLICATIONS

International Search Report issued in International Patent Application No. PCT/US19/19452 dated Jul. 22, 2019.

*Primary Examiner* — Negussie Worku
(74) *Attorney, Agent, or Firm* — Stephen H. Eland

(57) ABSTRACT

A system is provided for processing documents. In particular, the system incorporates a feeder for feeding documents to a device for further processing of the documents. For instance, the system finds particular application in the field of document imaging in which a variety of documents of varying sizes and orientation are to be fed to an imaging system, such as a document scanner. The system may provide a sorting station that receives documents from a work station and sorts the documents to a plurality of sort locations. The system may export the image data for the documents to a fileserver so that a remote operator can provide instructions for the processing of the documents so that the documents can be subsequently processed according to the instructions provided by the operator.

18 Claims, 9 Drawing Sheets

(51) Int. Cl.
  *B65H 39/115* (2006.01)
  *B65H 29/58* (2006.01)
  *B07C 3/08* (2006.01)
  *B07C 3/14* (2006.01)
  *B07C 3/06* (2006.01)
  *B65H 29/52* (2006.01)

(52) U.S. Cl.
  CPC ............ *B65H 29/52* (2013.01); *B65H 29/58* (2013.01); *B65H 39/115* (2013.01); *H04N 1/00641* (2013.01); *H04N 1/17* (2013.01); *B65H 2404/154* (2013.01); *B65H 2404/2693* (2013.01); *B65H 2404/725* (2013.01); *B65H 2405/332* (2013.01); *B65H 2405/354* (2013.01); *B65H 2511/11* (2013.01); *B65H 2511/20* (2013.01); *B65H 2513/42* (2013.01); *B65H 2701/1916* (2013.01)

(56) References Cited

U.S. PATENT DOCUMENTS

| | | | |
|---|---|---|---|
| 3,057,655 A | 10/1962 | Burt | |
| 3,079,167 A | 2/1963 | Russell | |
| 3,088,770 A | 5/1963 | Ferneau | |
| 3,669,031 A | 6/1972 | Cole | |
| 3,759,565 A | 9/1973 | Ferneau | |
| 3,980,334 A | 9/1976 | Ferneau | |
| 4,052,097 A | 10/1977 | Weil | |
| 4,192,541 A | 3/1980 | Ferneau | |
| 4,921,295 A | 5/1990 | Stollenwerk | |
| 4,934,681 A * | 6/1990 | Holmes | G03G 15/23 270/58.18 |
| 4,949,949 A * | 8/1990 | Holmes | G03B 27/6257 271/184 |
| 5,015,024 A | 5/1991 | Bloemer | |
| 5,084,922 A | 2/1992 | Louit | |
| 5,105,363 A * | 4/1992 | Dragon | B41J 9/46 226/29 |
| 5,273,516 A | 12/1993 | Crowley | |
| 5,509,159 A | 4/1996 | Du-Bois | |
| 5,537,700 A | 7/1996 | Way | |
| 5,819,671 A | 10/1998 | Ocampo | |
| 5,863,052 A | 1/1999 | Roman | |
| 6,070,899 A | 6/2000 | Gines | |
| 6,203,085 B1 | 3/2001 | Ferris | |
| 6,550,764 B2 | 4/2003 | Wilson et al. | |
| 6,575,491 B2 | 6/2003 | Miller | |
| 6,976,696 B2 | 12/2005 | O'Krangley | |
| 7,131,151 B2 | 11/2006 | Ferneau | |
| 7,140,055 B2 | 11/2006 | Bishop | |
| 7,308,858 B2 | 12/2007 | Lo | |
| 7,389,552 B1 | 6/2008 | Reed | |
| D574,881 S | 8/2008 | Forbes | |
| 7,424,758 B2 | 9/2008 | Broadley | |
| 7,478,855 B2 | 1/2009 | Lambarth | |
| 7,988,120 B2 | 8/2011 | Hsu | |
| 8,051,513 B2 | 11/2011 | Reed | |
| 8,439,416 B2 | 5/2013 | Lambarth | |
| 8,459,632 B2 | 6/2013 | DeWitt et al. | |
| 8,640,283 B2 | 2/2014 | Broadley | |
| 8,714,612 B2 | 5/2014 | Chinn | |
| 8,793,196 B2 | 7/2014 | Parkos et al. | |
| 8,939,274 B1 | 1/2015 | Ross, Jr. | |
| 9,107,781 B1 | 8/2015 | Edgerton | |
| 9,381,128 B2 | 7/2016 | Rozewicz | |
| 9,731,740 B1 | 8/2017 | Chafin | |
| 9,849,582 B2 | 12/2017 | Cheff | |
| 10,049,297 B1 | 8/2018 | Chen et al. | |
| 2002/0105169 A1 | 8/2002 | Dahl | |
| 2002/0172399 A1 | 11/2002 | Poulin et al. | |
| 2004/0070798 A1 | 4/2004 | Andersen et al. | |
| 2004/0111798 A1 | 6/2004 | Matunaga | |
| 2005/0018214 A1 * | 1/2005 | DeWitt | B07C 3/00 358/1.1 |
| 2005/0229312 A1 | 10/2005 | Bishop | |
| 2006/0006628 A1 | 1/2006 | Fields | |
| 2006/0231736 A1 * | 10/2006 | Matsuda | H04N 1/32101 250/208.1 |
| 2007/0003009 A1 | 1/2007 | Gray | |
| 2007/0109605 A1 * | 5/2007 | Shimizu | G06T 7/0002 358/3.26 |
| 2007/0110277 A1 * | 5/2007 | Hayduchok | B07C 3/00 382/101 |
| 2007/0169977 A1 | 7/2007 | Ellis | |
| 2009/0000034 A1 | 1/2009 | Myers | |
| 2010/0006649 A1 | 1/2010 | Bolton | |
| 2010/0038839 A1 * | 2/2010 | DeWitt | G06K 9/00442 270/52.01 |
| 2011/0254219 A1 | 10/2011 | Helmlinger et al. | |
| 2011/0266821 A1 | 11/2011 | Goto | |
| 2011/0277426 A1 | 11/2011 | Allen et al. | |
| 2012/0113488 A1 | 5/2012 | Machida et al. | |
| 2012/0199753 A1 | 8/2012 | Chuang | |
| 2012/0275896 A1 | 11/2012 | Magill | |
| 2015/0144536 A1 | 5/2015 | Dugat | |
| 2015/0216747 A1 | 8/2015 | Valentino | |

* cited by examiner

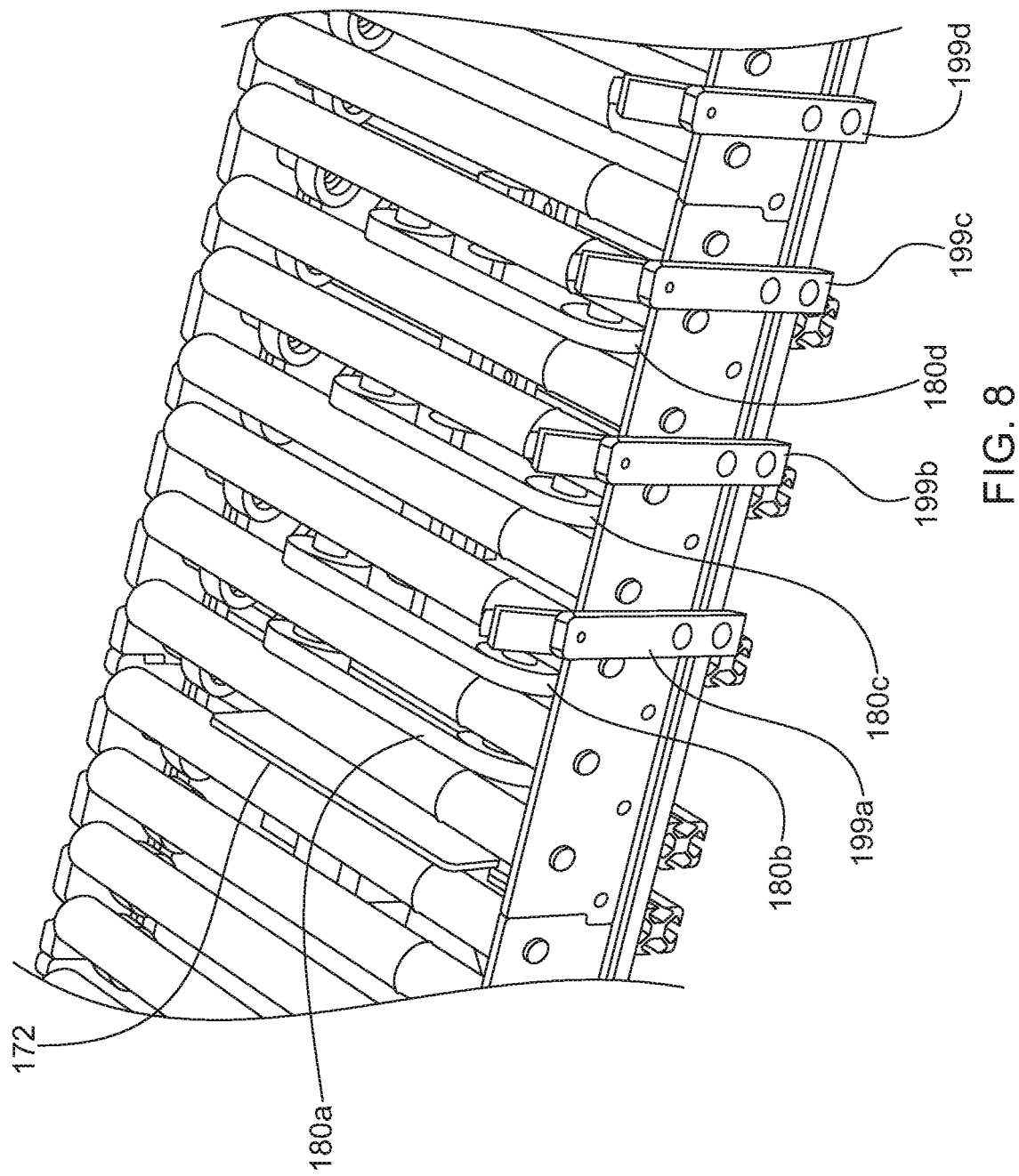

DOCUMENT IMAGING SYSTEM AND METHOD FOR IMAGING DOCUMENTS

PRIORITY CLAIM

This application claims priority to U.S. Provisional Patent Application No. 62/634,723 filed on Feb. 23, 2018. The entire disclosure of the foregoing application is hereby incorporated herein by reference.

FIELD OF THE INVENTION

The present invention relates to the field of document processing. In particular, the present application relates to processing documents to feeding documents to a device for further processing of the documents. The present invention finds particular application to the field of document imaging in which documents are to be fed to an imaging system, such as a document scanner.

BACKGROUND

Automated and semi-automated machines have been employed for processing documents. Frequently a batch of documents, such as mail are sorted according to criteria determined for the batch. However, in some instances, it may be desirable to sort the documents on a document by document basis. In such instances it may be desirable to provide a mechanism to allow user input to make a sort decision for each document, however, allowing such input may significantly delay the processing of subsequent documents.

SUMMARY OF THE INVENTION

In light of the foregoing, an apparatus is provided for improving the processing of documents. According to one aspect, the present invention includes a first conveyor for receiving documents and a scanner configured to scan the documents to obtain image data for the documents. A feeder is configured to receive documents from the first conveyor and serially feed documents from the first conveyor to the scanner. A sort station comprising an input conveyor is configured to receive documents from the scanner. The sort station includes an imaging station, a printing station and a sorter. The imaging station is configured to scan the documents to obtain a second set of image data for the documents as the input conveyor conveys the documents past the imaging station. The printing station is configured to selectively print an identification mark on the documents as the documents are conveyed past the printing station. The sorter is configured to sort the document to a plurality of output locations.

According to another aspect, the present invention provides an apparatus for processing documents that includes a conveyor, a plurality of output bins and a sorter. The sorter includes a length detector for detecting a characteristic indicative of the length of the documents. The sorter also includes a set of ejectors configured to displace documents on the conveyor transverse the document path. The ejectors in the first set of ejectors are independently actuable and each of the ejectors in the first set of ejectors is positioned to eject documents toward a first one of the output locations. A controller selectively actuates one or more of the ejectors in the first set of ejectors to eject one of the documents based on the detected characteristic that is indicative of the length of the document.

According to yet another aspect, the present invention provides an apparatus for processing documents that includes a conveyor, an imaging station, a printer and an image processor. The printer is operable to print an identification mark on the document as the document is conveyed along a document path. The image processor is operable to process the image data from the imaging station to identify the location of a clear zone and the printer is controlled to print the identification mark in the clear zone. The image processor is configured to prioritize certain areas of the document to increase the likelihood that the clear zone is determined to be in one of the prioritized areas.

According to a further aspect, the present invention provides an apparatus for processing a batch of documents. The apparatus includes a scanner configured to scan the documents to obtain image data for the documents and a sorter configured to receive documents from the scanner and sort the documents to a plurality of sort locations. A controller is operable to export the image data for the documents so that the image data for each document can be viewed by a remote user. The user can provide processing instructions for how each document in a batch is to be processed. The controller is configured to control the operation of the sorter to sort each document to one of the plurality of sort locations based on the instructions received for each document from the user.

According to another aspect, the present invention provides a method for processing a batch of document. The method includes the steps of scanning a batch documents to obtain image data for each document and exporting the image data for each document so that a remote operator can provide processing instructions for each document. The batch of documents is scanned a second time to obtain a second set of image data for each document. The second set of image data for each document is then processed to identify each document. After the step of processing the second set of image data for one of the documents in the batch, it is determined whether instructions for processing the document have been provided by the operator. The document is then sorted based on the instructions provided by the operator for the document.

While the methods and apparatus are described herein by way of example for several embodiments and illustrative drawings, those skilled in the art will recognize that the inventive methods and apparatus for sorting items using a dynamically reconfigurable sorting array are not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the methods and apparatus for sorting items using one or more dynamically reconfigurable sorting array defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DESCRIPTION OF THE DRAWINGS

The foregoing summary and the following detailed description of the preferred embodiments of the present invention will be best understood when read in conjunction with the appended drawings, in which:

FIG. 8 is an enlarged fragmentary perspective view of a portion of the sorting station illustrated in FIG. 2.

DETAILED DESCRIPTION OF THE INVENTION

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
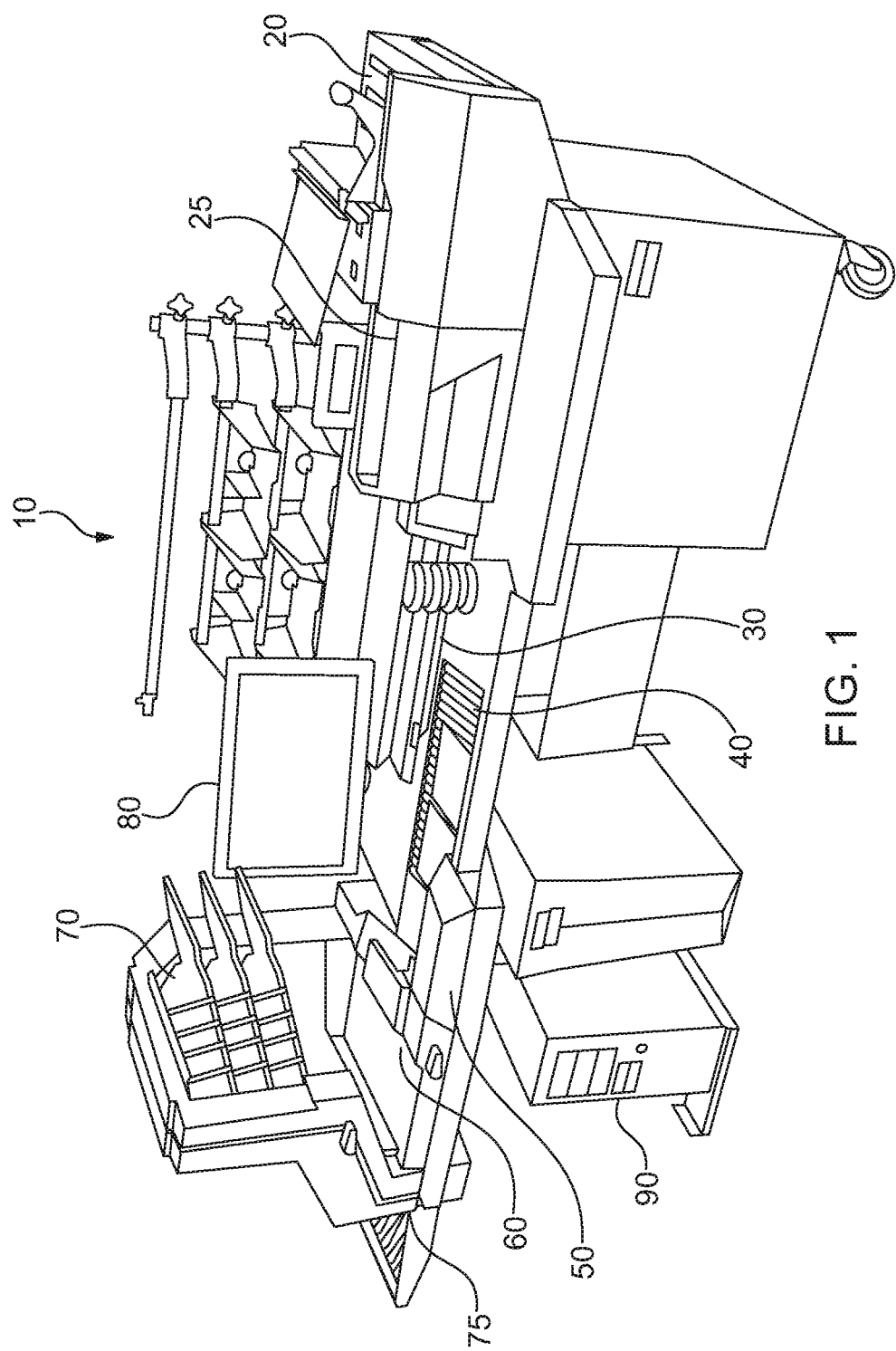
FIG. 1 is a perspective view of a work station for processing documents.
Figure 2:
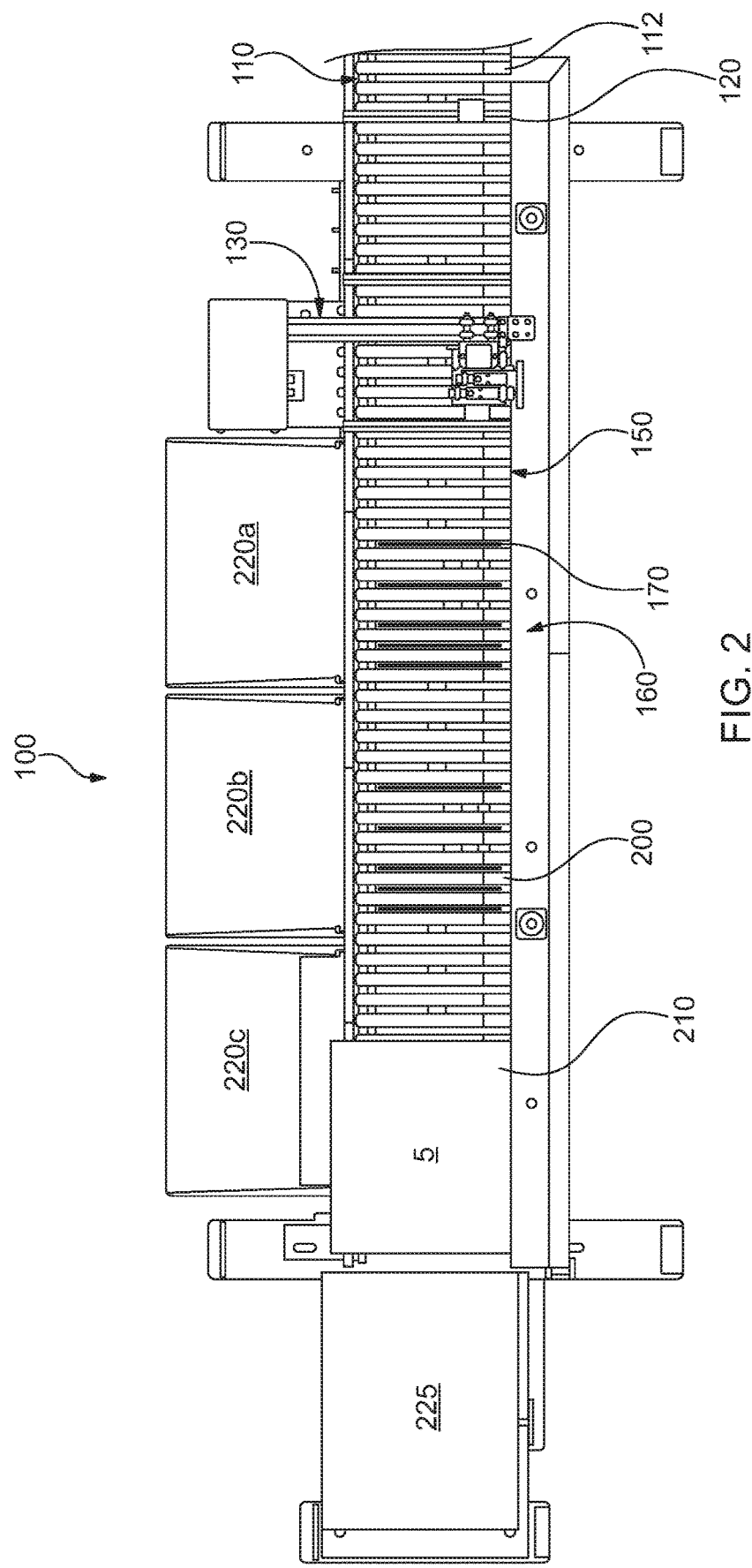
FIG. 2 is a plan view of a sorting station operable in conjunction with the work station illustrated in FIG. 1.

Referring now to the figures in general and to FIGS. 1 and 2 in particular, a system is illustrated, which includes a document scanning work station 10 and sorting station 110. The system is configured to process a variety of documents, including mail. In particular, the system has the capability of processing a variety of different sized documents. The system may selectively scan and sort the documents depending on a variety of criteria. Additionally, as shown in FIG. 1, the system may include elements for facilitating the processing of mail, such as by opening envelopes and facilitating the extraction of documents from with the envelopes. As described further below, the system may be configured in a variety of configurations that may or may not include elements designed to facilitate extraction of documents from envelopes.

Referring to a first embodiment illustrated in FIG. 1, the work station 10 may include document extraction and scanning stations. The embodiment illustrated in FIG. 1 is configured to facilitate the processing of documents in the form of envelopes containing items. The system is also able to process documents that have been extracted from envelopes or any other type of document. Accordingly, in the following discussion, when used throughout the description and the claims, unless otherwise noted, the term document may refer to any type of written or printed matter and may include envelopes and other mail pieces.

The work station in FIG. 1 includes an input bin 20 for receiving a stack of documents, such as mail in the form of envelopes containing documents. From the input bin, the documents are serially fed to an envelope opening station 25 that cuts the envelopes open along one or more edges. The edge-slit envelopes are then conveyed to an extraction station 30 where the faces of the envelope are pulled apart to present the contents to an operator to facilitate removal of the contents from the envelope. The empty envelope can then be discarded. Optionally, the operator may be able to retrieve the envelope for further processing with the contents.

After the contents are removed from an envelope, the operator may feed the documents to a scanner 60. In the present instance, the system may include a horizontal drop conveyor 40 configured to receive documents in a substantially flat or horizontal orientation. The drop conveyor 40 conveys the documents to a feeder 50. The feeder is configured to serially feed the documents to the scanner 60. The feeder 50 is preferably configured to accommodate a packet of documents so that the feeder can receive the packet from the drop conveyor 40 and then singulate the packet of documents so that the documents are serially fed to the scanner 60.

At the scanner 60, each document is scanned to obtain optical image data for each document. After being scanned, the documents are then sorted to one of a plurality of output bins 70. Alternatively, after being scanned the documents may be discharged to a bypass or through path 75. From the through path, the documents may be further processed as discussed further below.

The operation of the different stations is controlled by a central controller, such as a microprocessor 90. The central controller may also function as an image processor. Specifically, the microprocessor may be configured to process the image data obtained by the scanner. For instance, the image processor 90 may process the image data to attempt to identify and read text. Similarly, the image processor may attempt to identify and read a marking, such as a bar code. Additionally, the system may include an input/output device that provides information to the operator and allows the operator to input information regarding the documents being processed. For instance, the operator may input data that controls how a batch of documents are processed. Additionally, the operator may input information that controls how a particular document or packet of documents is processed. As shown in FIG. 1, the input/output device may be a touch screen display 80. Alternatively, the system may include any of a variety of input mechanisms, such as a mouse, touch pad, stylus or keyboard.

As described above, the system illustrated in FIG. 1 is configured to process documents, such as envelopes containing contents. The details of an exemplary system that describes the details of the input bin 20, the envelope opening station 25 and the extraction station are described in detail in U.S. Pat. No. 8,919,084. The entire disclosure of U.S. Pat. No. 8,919,084 is hereby incorporated herein by reference. Additionally, the details of an exemplary drop conveyor 40, feeder 50 and scanner 60 are described in detail in U.S. Pub. Appl. No. 2015/0319330, filed May 15, 2015. The entire disclosure of U.S. Pub. Pat. Appl. No. 2015/0319330 is hereby incorporated herein by reference.

The present system is directed to improving the flow of documents in a document processing system. The system has particular application to workstations directed to processing documents, and has particular application to processing packets of documents. In an exemplary embodiment, the workstation is configured as a semi-automated system for processing documents of a variety of types, including documents of varying size as well as folded documents, such as documents extracted from envelopes. As described above, the system may be incorporated into a larger system that includes elements such as a cutting station for cutting open envelopes and an extraction station for opening the envelopes to present the documents to the user for extraction. However, it should be understood that the present system has application to systems that do not incorporate document extraction features, but are instead directed to processing documents generally. For instance, features of the present system may be incorporated into a system that does not include the extraction features, but includes the horizontal conveyor, scanning station and sorting station. Further still, features of the system may have application generally in a document processing system in which it is desirable to manually feed packets of documents into the system without organizing or otherwise preparing the packets for feeding into the system.

Brief Overview of Document Extraction Embodiment

With the foregoing in mind, a general overview of the flow of documents in an exemplary system for processing mail is as follows. Initially, a stack of envelopes containing documents, referred to as a job, is placed into an input bin 20. A feeder removes the lead envelope 5 from the front of the stack and transfers the envelope to a feed tray.

The envelope 5 in the feed tray is edge-justified by a plurality of opposing rollers. From the feed tray, the envelope 5 drops into a side cutter, which severs the side edge of the envelope if desired. From the side cutter, the envelope drops into a shuttle. The shuttle moves vertically to adjust the height of the top edge of the envelope to account for variations in the height of the different envelopes in the job. The shuttle moves vertically until the height of the top edge of the envelope 5 is within an acceptable range for advancing the envelope into a top cutter. The envelope is then transported to the top cutter, which severs the top edge of the envelope 5.

From the top cutter the envelope is advanced to an extraction station 30. The extraction station 30 pulls apart the front and back faces of the envelope to present the contents of the envelope for removal. An operator then manually removes the contents from the envelope 5.

After the operator removes the contents from the envelope 5, the apparatus 10 automatically advances the envelope to a verifier. The verifier verifies that all the documents were removed from the envelope before the envelope is discarded. From the verifier the envelope is conveyed into a waste container. Alternatively, the envelope 5 may be manually removed and imaged at the scanning station 60.

After the documents are extracted at the extraction station 30, the operator unfolds as needed and drops or places the extracted documents onto a drop conveyor 40 that transports the documents toward a scanner or imaging station 60. An imaging entry feeder 50 receives the documents from the drop conveyor 40 and controls the feeding of the documents into the imaging station 60. The image entry feeder 50 is configured to receive and feed documents of various sizes and condition. For instance, frequently documents are folded in an envelope. When the documents are extracted and opened up, the documents are creased or folded so that they do not lie flat. The feeder 50 is preferably configured to receive such creased or folded documents and serially feed the folded documents into the imaging station 60 with minimal manual preparation by the operator.

The imaging station 60 includes an imager that obtains image data for each document as the document is conveyed past the device. For instance, preferably the imager is a scanner that obtains gray scale or color image data representing an image of each document. The scanner scans each document at a plurality of points as the document is conveyed past the scanner. The information for each document is stored in a data file for each document so that the image data can be accessed at a later time.

From the imaging device, preferably an imaging transport conveys the documents to a sorting station 70 that sorts the documents into a plurality of output bins. The documents can be sorted in a variety of ways. For instance, the documents can be sorted based on document information obtained from the image data received at the imaging station 60. Alternatively, the operator may indicate information regarding a document before it is scanned, so that the document is sorted according to the information indicated by the operator. Yet another alternative is that the documents may be stacked into one or more bins simply based on the order in which the documents are processed.

A controller controls the processing of the mail in response to signals received from various sensors at various locations of the workstation 10 and in response to parameters set for the job by the operator. For instance, in response to an indication from a sensor in the feed tray that there is no envelope in the feed tray, the controller sends a signal to the feeder in the input bin 20 indicating that an envelope should be fed from the input bin to the feed tray. Similarly, in response to an indication from a sensor in the shuttle that there is no envelope in the shuttle, the controller sends a signal to the feed tray indicating that an envelope should be dropped from the feed tray into the shuttle.

Figure 4:
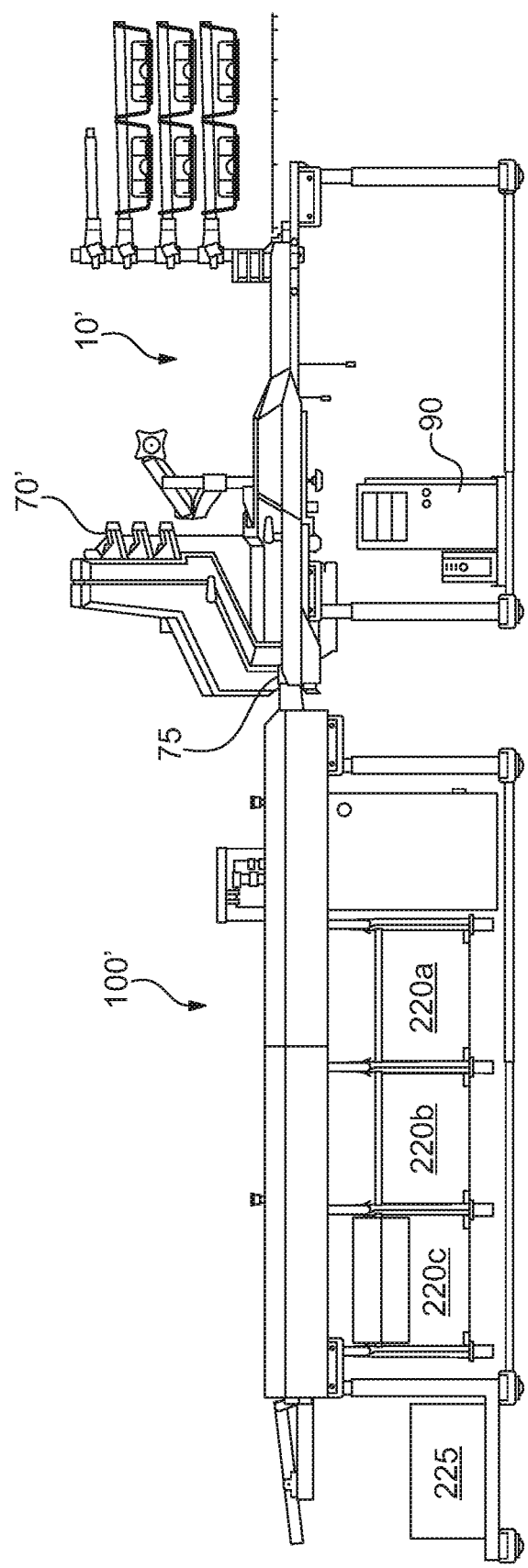
FIG. 4 is a side elevation view of an alternate work station
Figure 5:
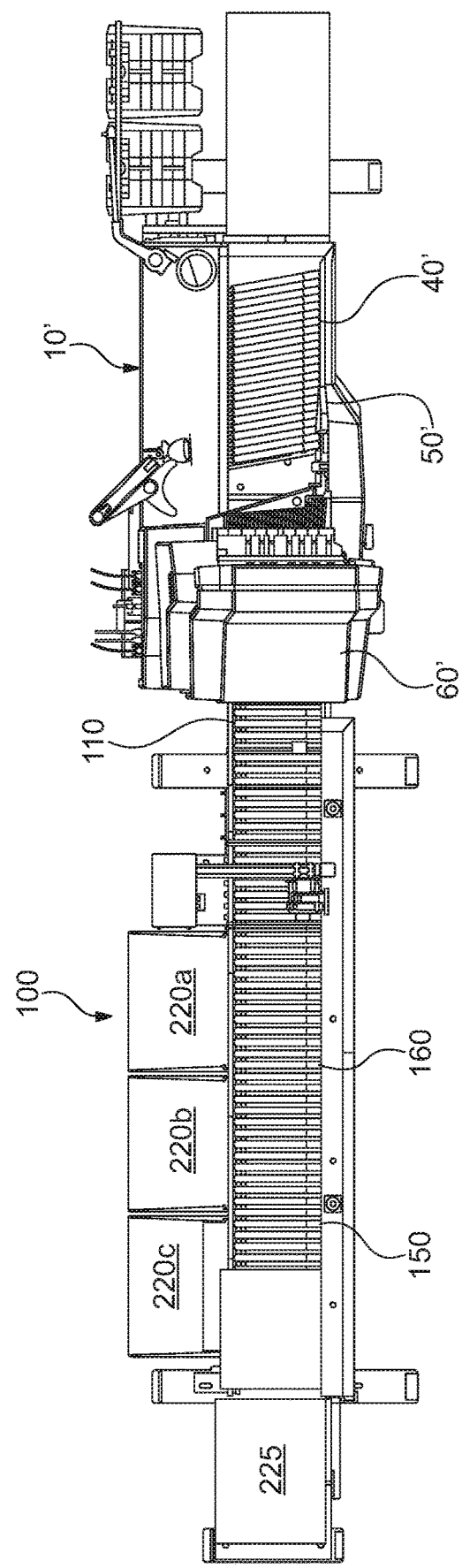
FIG. 5 is a plan view of the work station and sorting station illustrated in FIG. 4.

Referring to FIGS. 4-5, an alternative work station 10' is illustrated in combination with the sorting station 100. The alternative work station includes a drop conveyor 40', feeder 50' and scanner 60' configured substantially similar to the conveyor 40, feeder 50 and scanner 60 described above. However, the alternative work station does not include the mail opening stations, such as the input bin, the envelope opener and the extraction station. Accordingly, it should be understood that the sorting station 100 may be combined with a variety of scanning work stations that may include one or more stations designed to facilitate the processing of mail.

Sorting Station

Figure 3:
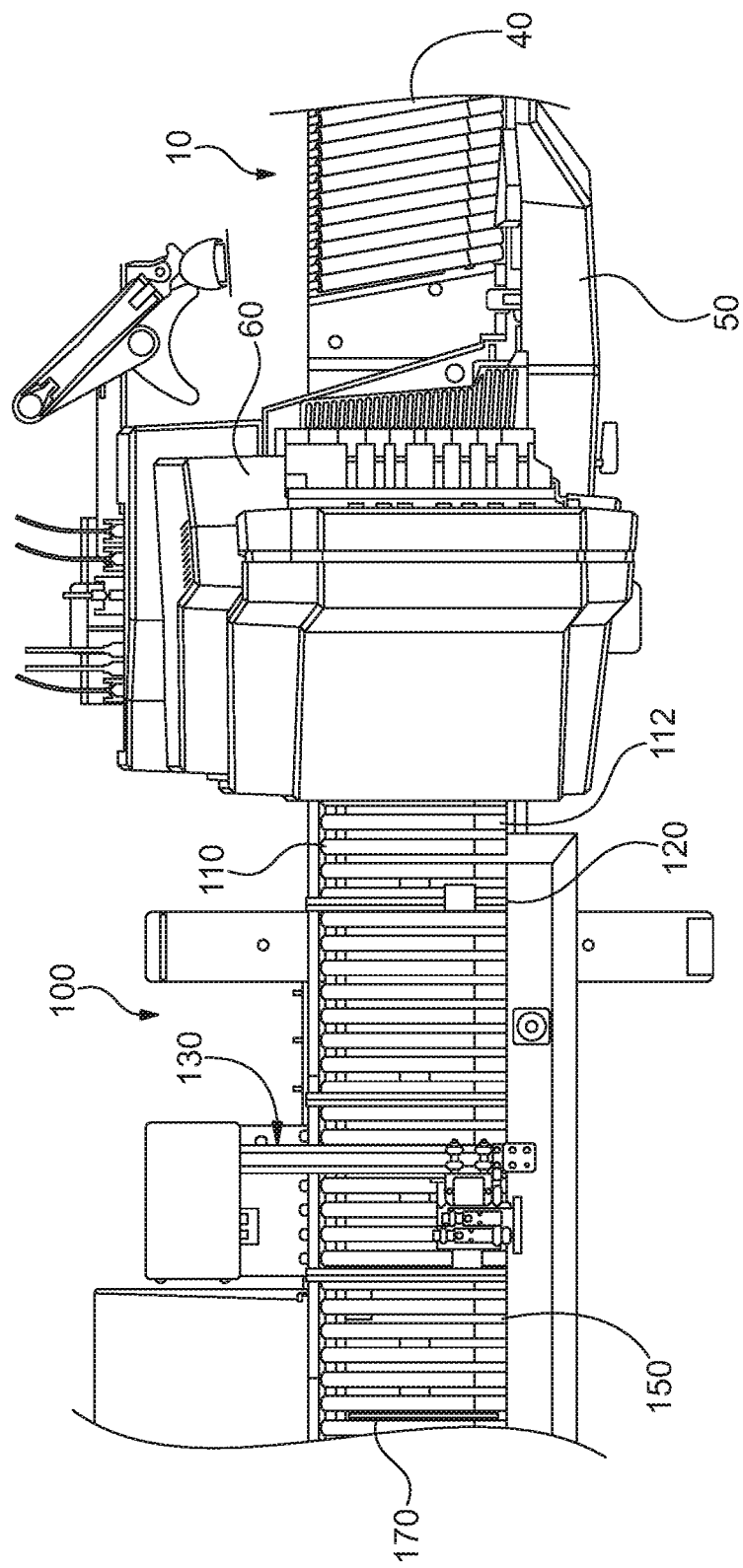
FIG. 3 is an enlarged fragmentary plan view of the work station illustrated in FIG. 1 in combination with the sorting station illustrated in FIG. 2.

As noted above, documents may be processed by the work station 10 by scanning and sorting the documents to output bins 70. Alternatively, documents may be scanned and directed to a bypass path 75. Referring to FIGS. 1-3, documents directed to the bypass path 75 are fed to a sorting station 100. Additionally, documents may be manually fed to the sorting station 100 by an operator.

The sorting station 100 includes an input conveyor 110 for receiving documents. The input conveyor conveys the documents to an imaging station 120 that images the documents. From the imaging station 120 the documents are conveyed past a printing station 130 that selectively prints indicia on the documents. From the printing station 130 the documents are conveyed to an output conveyor 150. A sorter 160 sorts the documents to a plurality of output locations, such as output bins 220a, 220b, 220c. A reject bin 225 may also be provided for receiving items from the output conveyor 150.

Referring to FIGS. 2-3 the details of the sorting station 100 will be described in greater detail. The input conveyor 110 is configured to facilitate receiving documents from either the bypass path 75 or directly from an operator. The input conveyor may comprise any of a number of mechanisms for conveying documents, such as belts or rollers. In the present instance, the input conveyor comprises a generally horizontal surface configured to receive documents in a horizontal orientation (i.e. a face of the document is generally horizontal). For example, the input conveyor may be a generally horizontal conveyor belt so that documents can be dropped face down or face up onto the belt. As illustrated in FIG. 3, the input conveyor 110 in the illustrated embodiment comprises a plurality of elongated rollers 112. The rollers rotate around generally horizontal axes and a driven by a drive element, such as one or more belts that rotate the rollers. Configured in this way, documents fed onto the input conveyor 110 ride on top of the rollers 112. Additionally, the conveyor is configured to convey the documents without positively entraining the documents.

The input conveyor 110 conveys the documents to the imaging station 120. The imaging station 120 captures optical image data of the documents as the documents are conveyed by the input conveyor 110. The imaging station may include any of a variety of image capturing devices configured to obtain image data while the documents are moving. In the present instance, the imaging station comprises a line scan camera 125. Alternatively, the imaging station may comprise a contact image sensor.

The line scan camera 125 scans the document to obtain a set of image data representative of the document. Data acquired by the line scan camera is then processed by one or more image processors. The image processors may be in the form of microprocessors on a separate imaging computer that is connected with the line scan camera. However, in the present instance, the image processor is an embedded processor in the line scan camera assembly. The image processor is operable to convert the image data to gray scale, such as 8-bit grey scale. Additionally, as discussed further below, the image processor is operable to binarize the gray scale image data to create a black and white representation of the document image.

By binarizing the data, the data for each pixel is converted from an eight-bit gray scale representation to a one bit black or white representation, which significantly reduces the processing required to make certain determinations for the document that may be used to control further processing as discussed further below. For instance, binarizing the image data highlights portions of the image that include text or other printed matter.

To binarize an image, the gray scale data for each pixel of the image is compared with a threshold. If the gray scale number for a pixel is above the threshold, the gray scale is converted to white. Conversely, if the gray scale number is below the threshold, the gray scale is converted to black.

To account for variations among the different documents being processed, an adaptive threshold may be used so that the binarization threshold is variable for each document. An adaptive threshold uses a different threshold for each document based upon a sampling of the image data for the document.

In addition to binarizing the image data, the image data may be filtered to reduce noise, which eliminates unnecessary background and stray marks from the document image. The noise filtering can be performed either in series or in parallel with the binarization.

The image data may then be stored in a short term or long-term storage device. For instance, the system may be connected with a network so that the document images may be exported and stored on a server 250, such as a file server. The server may be local or it may be remote. As discussed above, the system may binarize the image data to create a black and white image. In the present instance, the binarized data is analyzed and used to control the further processing of the document. However, the binarized image data need not be stored on the file server. Instead, the grey-scale image data is stored on the image server.

Figure 6:
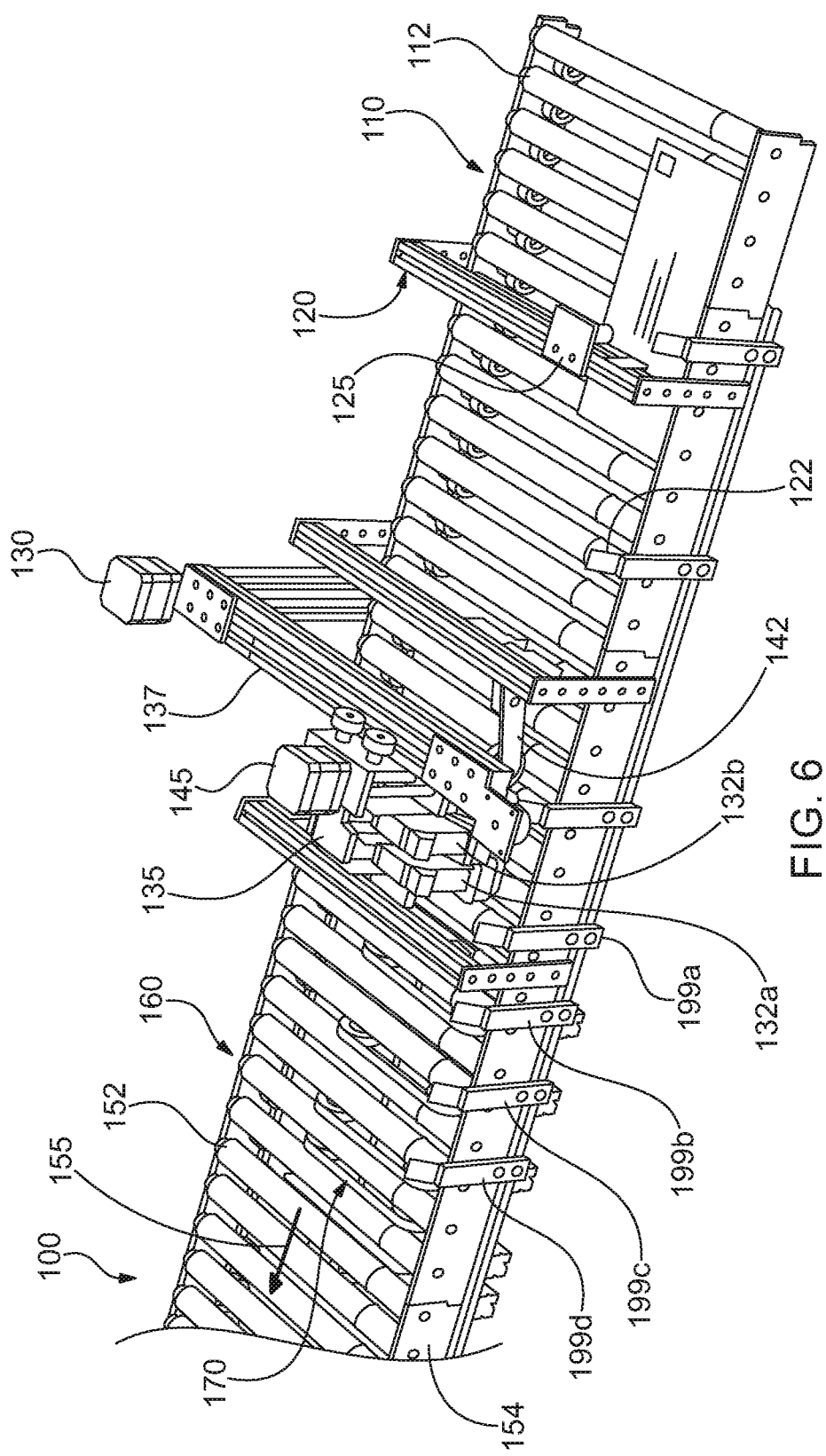
FIG. 6 is an enlarged fragmentary perspective view of the sorting station illustrated in FIG. 2.

Referring to FIG. 6, from the imaging station 120 the documents are conveyed to a printer station 130. At the printer station 130 an identifying mark may be selectively applied to the document. For instance, the printer station 130 may apply a bar code or other identification mark on a document. The printer station 130 may also print human readable markings, such as text or graphics.

The print station 130 includes one or more print heads 132. The printer may be any of a variety of print heads and in the present instance, the print head is ½" fixed print head 132. Additionally, in the present instance, to increase the area upon which the print station 130 can print, the print station includes two print heads 132a, b. Each print head is substantially similar so that the print area that can be covered by the print heads is doubled. The system may control the actuation of the print heads 132a,b to control the area on the document on which the print head prints. Specifically, the system may configure the system so that the printer prints in a consistent location on each document. The controller that controls the print station can control the actuation of the print head to control the location where the printer prints along the length of the document. Specifically, a sensor adjacent the print station detects the leading edge of the document as the document enters the print station. To control the location of printing along the length of the document, the controller controls when the print head is actuated while the document passes under the print head. A shorter delay from when the lead edge of the document is detected will cause the printer to print closer to the leading edge of the document. A longer delay will cause the printer to print closer to the trailing edge.

Although the system may be configured to print in a consistent location, it may be desirable to selectively vary the location where the printer prints on the documents. For instance, as discussed below, the system may scan the document to identify an area free from text or graphics. The system may then control the print station to print the indicia in the desired location. Specifically, to control the area of printing the system may vary the timing of actuating one of the print heads to control the area along the length of the document where the print head prints. In this way, the selective actuation of the print head may be based on identification of the desired print location for the document, detection of the leading edge of the document and the document speed as the document is conveyed past the print head. Additionally, the system may control the location of the print area across the width of the document by selectively actuating the print heads. In particular, the first print head 132*a* is able to print in a first area across the width of the document and the second print head 132*b* is positioned to print in a second area across the width of the document. Therefore, the system may control where the document prints across the width of the document by selectively actuating the first head to print in a first area or by actuating the second print head to print in a second area. In this way, the system can control the location of the printing by variably controlling two variables: (1) which print head 132*a,b* is actuated; and (2) the timing the print head is actuated.

The print station may also include elements for controlling the position of the print heads. Specifically, the print heads 132*a,b* may be mounted on a carriage 135 that is moveable across the width of the document. Referring to FIG. 6, the print station 130 may include a horizontal rail 137 that extends across the width of the conveyor 110. The rail 137 supports the carriage 135. In particular, the carriage slidably engages the rail so that the carriage is displaceable across the width of the conveyor. A drive motor, such as a stepper motor 139 is operable to drive the carriage 135 along the rail. The motor may be controlled to drive the carriage across the entire width of the conveyor. However, in the present instance, the motor 139 is controlled to drive the carriage across a subset of the width of the conveyor. In particular, the motor is controlled to drive the carriage across a subset of the expected width of the documents being processed. For instance, the motor may be controlled to drive the carriage in a first direction to increase the area on which the first print head 132*a* prints. Additionally, the motor may be controlled to drive the carriage in a second direction to increase the area on which the second print head 132*b* prints. By way of example, each print head may be a ½" fixed print head. The motor may be controlled to drive the carriage in a first direction a distance equal to the size of the print head, such as ½". In this way, by driving the carriage ½" the area on which the first print head 132*a* can print is doubled. Similarly, the motor may be controlled to drive the carriage in a second direction to increase the area in which the second print head 132*b* can print. Accordingly, for a pair of ½" print heads the print area can be doubled by providing ½" travel in a first direction and ½" travel in the second direction. By way of example, for a standard #10 envelope this increases the effective area of print coverage to nearly have of the width of the envelope.

In addition to moving the print heads 132*a,b* in a horizontal direction, the print station 130 may be configured so that the print heads can be displaced in a vertical direction. For instance, the carriage 135 may be connected to a vertical rail or post 144. The carriage may be configured to slidably engage the vertical rail 144 so that the print heads 132*a,b* are displaceable vertically relative to the document. A vertical drive motor 145, such as a stepper motor is connected with the carriage. Driving the motor 145 in a first direction drives the carriage 135 and the print heads 132*a,b* upwardly. Driving the motor 145 in a second direction drives the carriage and the print heads 132*a,b* downwardly.

If the print station 130 includes both a vertical rail 144 and a horizontal rail 137, the carriage may directly engage one of the rails and such rail may in turn be displaceable relative to the other rail. For example, the carriage 135 slidably engages the vertical rail 144 and the vertical drive motor 145 displaces the carriage vertically. The vertical rail 144 is connected with the horizontal rail 137 so that horizontal drive motor 139 drives the vertical rail horizontally, which in turn drives the carriage horizontally.

The vertical displacement of the print heads 132*a,b* may be controlled on a job by job basis or on a piece by piece basis. For instance, prior to starting a job the operator may input information indicative of or related to the expected thickness of the pieces that are to be processed in the job. By way of example, a job may include the processing of courier packs, such as Federal Express mailers. Such documents are significantly thicker than documents such as normal piece of mail, such as a typical #10 envelope. Accordingly, the operator may input information to the system indicating that a job of thick documents is being processed and the vertical drive motor may drive the carriage 135 upwardly to accommodate thicker mail.

Alternatively, the system may be configured to control the height of the carriage on a piece by piece basis. Specifically, the system may include a thickness detector adjacent the entry to the print station 130. The thickness detector may be any of a variety of thickness detection devices. For instance, in the present instance the print station 130 includes a document hold down 142 that engages the documents to hold the documents down against the conveyor as the documents enter the print station. A detector detects the position of the hold down. The position of the hold down is indicative of the thickness of the document entering the print station.

The thickness detector 142 detects the thickness of the piece and the system selectively varies the vertical position of the print heads 132*a,b* in response to the detected thickness. In the present instance, the controller controls the operation of the vertical drive motor 145 in response to the detected thickness for a document. Specifically, the system varies the vertical position of the print heads to maintain the gap between the print heads and the upper surface of the document within a predetermined range. In this way, the distance that the ink travels between the print heads and the document is maintained within a predetermined range.

From the print station 130 the documents are conveyed along an output conveyor 150 to a sorter 160 that selectively sorts the documents to a plurality of output locations, such as output bins 220*a,b,c*. Referring to FIGS. 5-8 the details of the output conveyor 150 and sorter 160 are described in greater detail below.

The output conveyor 150 comprises a plurality of horizontal rollers 152 similar to the rollers 112 described above in connection with the input conveyor 110. The rollers 152 are driven rollers so that the rollers convey the documents forwardly along the output conveyor. As with the input conveyor 110, the output conveyor 150 conveys the documents with the documents riding on top of the roller to that the documents are not positively gripped or entrained by the conveyor.

The output conveyor 150 includes a side wall 154 that extends along substantially the entire length of the output conveyor 150/sorter 160. The side wall 154 extends upwardly forming a stop preventing documents from falling off the side of the output conveyor 150/sorter 160. The rollers 152 may be skewed at an angle relative to the justification rail so that the rollers tend to drive the documents toward the side wall 154.

The sorter 160 is positioned along the output conveyor and is configured to selectively sort documents to a plurality of sort locations 220 based on any of a variety of criteria. For instance, the criteria may be determined during processing at the scanning station 120 or the sort criteria may be based on criteria such as the detected thickness, detected length or other criteria.

The sorter 160 may comprise any of a variety of structures adapted to selectively direct documents from a first path to a second path directed toward an alternate output location. In particular, the output conveyor 150 conveys the documents along a document path indicated as arrow 155 in FIG. 6. In the present instance, the sorter 160 includes one or more discharge assemblies 170, 200, 210 that drive the documents traverse the document path 155 toward one of the output areas 220a,b,c (discharge assembly 210 is hidden below mail piece 5 in FIG. 2).

The sorter 100 includes a discharge assembly for each sort location 220. The discharge assembly is configured to selectively drive a document off the output conveyor 150 and into one of the sort locations in response to a control signal. In the present instance, the sorter 160 includes three separate discharge assemblies 170, 200, 210. The three separate assemblies are independently actuable and all three are configured substantially similarly.

Figure 7:
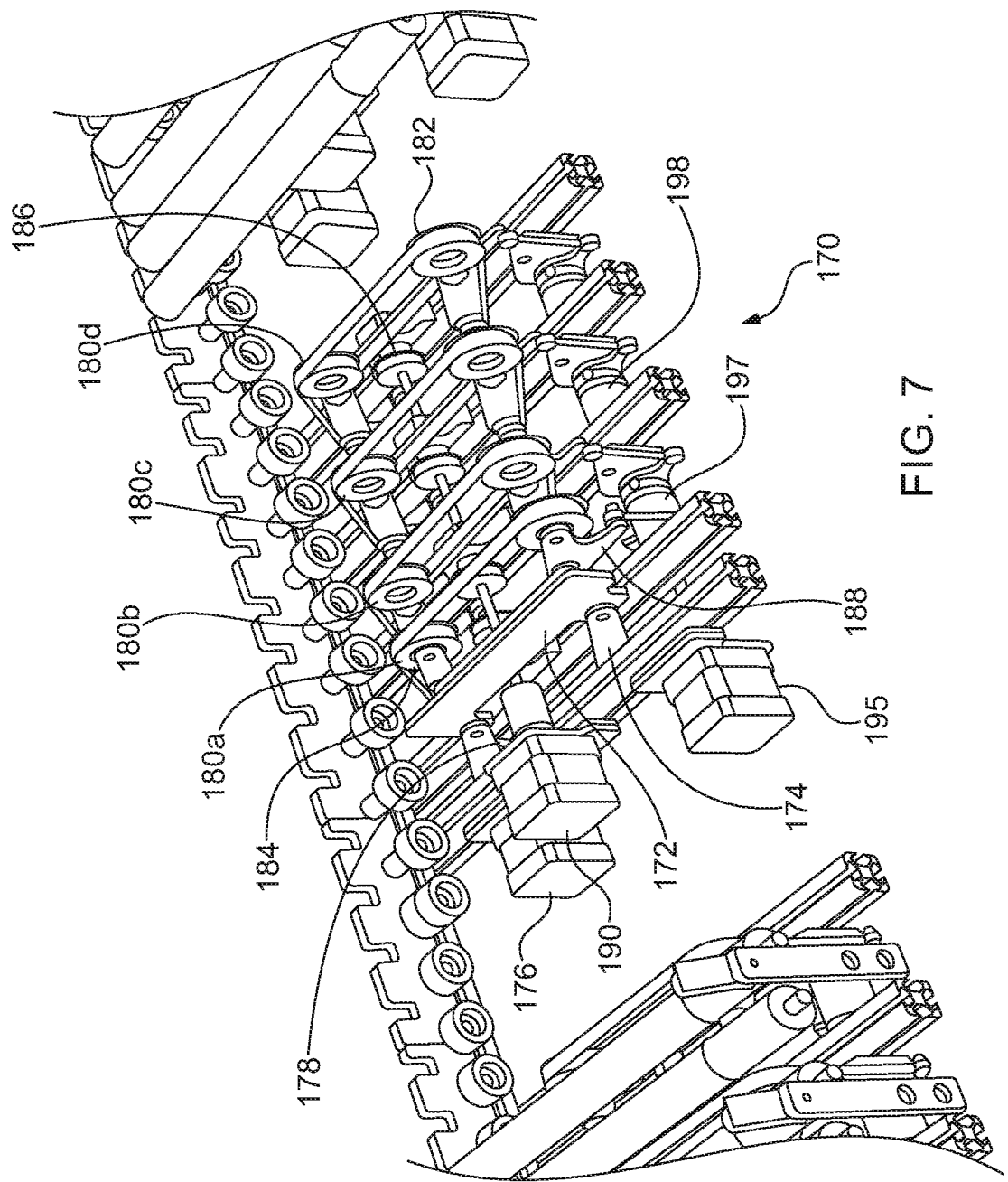
FIG. 7 is an enlarged fragmentary exploded view of a portion of the sorting station illustrated in FIG. 2.

Referring to FIGS. 6-8, the details of the first discharge assembly 170 will now be described in greater detail, with the understanding that the description of the first discharge assembly applies equally to the second and third discharge assemblies 200, 210.

The first discharge assembly 170 is an assembly that is recessed between the rollers 152 in the output conveyor 150. The discharge assembly 170 has various elements that are actuable between two positions. The first position is a recessed position, the second position is a raised position. In the recessed position, documents on the output conveyor pass over the discharge assembly. In the raised position, select elements of the discharge assembly raise up above the top surface of the output conveyor to engage the document and drive the document toward the sort location.

The discharge assembly includes two elements: a fence 172 for stopping the forward progress of the document and a plurality of cross belt assemblies 180 for driving the document across the document path 155 to the output or sort area. Additionally, the discharge assembly includes three drive controls: a first drive control for raising the fence 172, a second drive control for raising the cross-belt assemblies 180 and a third drive control for driving the cross-belt assemblies 180 to convey the document to the discharge area.

The fence 172 is configured to engage documents on the output conveyor and impede forward displacement along the document path 155. The fence may be configured in an of a variety of forms to stop documents. In the present instance, the fence 172 a substantially planar wall having a width that extends across the width of the output conveyor and a height that extends upwardly from the surface of the output conveyor. In the present instance, the fence has a width that is substantially greater than its height. Additionally, the fence 172 has a width that extends across a substantial portion of the width of the output conveyor to ensure that the documents engage the fence when the fence is raised. The height of the fence may vary depending upon the application. In the present instance, the fence is approximately ½"-3" high.

The fence 172 is connected with a linkage configured to raise and lower the fence. In the present instance, the fence 172 is connected with two pivot arms 174 to form a four-bar linkage. A connected rod 178 interconnects one of the pivots arms 174 with the output shaft of the fence drive motor 176. In this way, driving the fence motor 176 in a first direction rotates the pivots arms in a first direction (counter clockwise from the perspective of FIG. 7) thereby raising fence 172 above the upper surface of the output conveyor 150. Driving the fence motor 176 in a second direction, opposite the first direction, pivots the pivots arms in a second direction to lower the fence to a recessed position below the upper surface of the output conveyor 150.

Since the system is designed to process mail of various lengths, the discharge assembly 170 preferably includes a plurality of spaced apart cross belt assemblies to engage the document along the length of the document. In the present instance, the discharge assembly 170 includes four independently operable cross belt assemblies 180a,b,c,d. Each of the cross-belt assemblies is substantially similar. Therefore, unless otherwise specified, the following description of the first cross-belt assembly 180a is applicable to the remaining cross belt assemblies 180b,c,d.

The cross-belt assembly 180a includes a drive belt 182a entrained around a plurality of idler rollers or pulleys 184a and a drive pulley 186a. The idler pulleys 184 are mounted on a pair of pivot arms 188 that are operable to raise and lower the belt 182. A connecting rod 197 connects one of the pivot arms with the lift drive motor 195. In this way, driving the lift motor 195 in a first direction rotates the pivots arms 188 in a first direction (counter clockwise from the perspective of FIG. 7) thereby raising drive belt 182 above the upper surface of the output conveyor 150. Driving the lift motor 195 in a second direction, opposite the first direction, pivots the pivots arms 188 in a second direction to lower the belt 182 to a recessed position below the upper surface of the output conveyor 150.

A cross belt drive motor 190 is operable to drive the cross belts 182. In particular, an output shaft from the belt drive motor 190 interconnects the drive pulley 186 for each of the cross-belt assemblies 180a,b,c,d. When the belt drive motor 190 is actuated the belt drive motor drive the drive pulleys 186 which drives each cross belt 182. In this way, if a cross belt is raised into the raised position above the output conveyor, the cross belt is operable to drive a document across the output conveyor and into the sort location 220a.

Since the sorting station 100 is configured to process a variety of documents, the lengths of the documents in a batch of mail may vary drastically. For instance, the shortest document in a batch may be less than half the length of the longest document in a batch. To facilitate the sorting of such variable length documents, it may be desirable for each discharge assembly 170, 200, 210 to include a plurality of spaced apart cross belt assemblies 180. In the embodiment illustrated in the drawings and described above, each discharge assembly includes four separate cross belt assemblies. However, it should be understood that the discharge assemblies may be configured with fewer cross belt assemblies or more cross belt assemblies.

Since the discharge assembly 170 includes a plurality of cross belt assemblies, when a document is to be discharged by the discharge assembly, all the cross-belt assemblies 180a,b,c,d may be raised and actuated to drive the document across the conveyor and into the sort location 220. However, problems may arise if all the cross-belt assemblies are raised when the discharge assembly is to discharge a document. For instance, when the document hits the fence 172 the document may tend to rebound. If the document is short enough that it does not cover all the cross-belt assemblies, when the document rebounds from the fence the trailing edge of the document may slide under one of the cross-belt assemblies, thereby causing a jam. Conversely, if a long piece is to be discharged and only the first one or two cross belt assemblies

180*a,b* are raised, then the cross-belt assemblies will only engage the front portion of the document so that the cross belts will tend to skew the document rather than driving the document across the conveyor and into the sort location 220. Accordingly, it may be desirable to selectively raise the cross-belt assemblies based on the length of the document being discharged.

Referring to FIG. 8, the discharge assembly 170 may include one or more sensors for detecting the length of the document. For example, the system may include a length detection sensor downstream from the printing station 130. The length sensor may detect the leading edge of the document and then detect the trailing edge of the document. The length of the document may be calculated based on the speed of the conveyor and the time delay between detection of the leading edge and detection of the trailing edge. However, since the conveyor 150 does not positively entrain the documents, the documents may slip on the conveyor so that the document speed may be different from the conveyor speed. Therefore, it may be desirable to use a plurality of sensors to detect a characteristic indicative of the length of the document. Specifically, the discharge may include a plurality of sensors spaced apart from one another. In the embodiment illustrated in FIG. 8, the system includes four sensors 199*a,b,c,d*. The sensors each detect the presence of a document at a point along the conveyor. As a document enters the discharge assembly area, when the document passes the first sensor 199*a* the system detects the presence of the document. For instance, the sensor 199*a* can be a beam break sensor with a transmitter and a receiver. When the document passes the first sensor the document breaks the beam indicating that the leading edge of the document is at the first sensor. Similarly, when the document is first sensed by the first sensor, the document will also be detected by any of the remaining sensors that are covered by the length of the document. In this way, the sensors do not detect the actual length of the document. Instead, the sensors detect whether the document is within a first length range, a second length range, a third length range or a fourth length range.

Based on detection of information indicative of the document length, the system selectively actuates the cross-belt assemblies. In particular, based on the determination of the document length, the system selectively raises one or more of the cross belts 182 to eject the document. For instance, if the document covers the first sensor 199*a*, but does not cover the trailing three sensors 199*b,c,d* the system may control the discharge assembly by only raising the first cross belt 182. If the document covers the first three sensors 199*a,b,c* but not the fourth sensor, the system may raise two or more of the cross-drive belts 182. For example, the system may raise the first second and third belts 182*a,b,c* to discharge the document. Alternatively, the second cross drive belt may be unnecessary in such an instance. Therefore, the system may raise only the first and third cross belts 182*a, c*.

The discharge assembly 170 may utilize a variety of elements to selectively control which cross belt assembly is raised in response to the detection of the document length. In the present instance, the cross-belt assemblies 180 each include an independently actuable clutch 198. The clutch provides a releasable connection between the lift motor 195 and the connecting rod 197. In particular, in response to the detection of the document length, the system determines which cross belt assemblies is to be raised. The system then actuates the clutch 198 for each cross-belt assembly that is to be raised. Therefore, when the lift motor is actuated, each clutch that is actuated will connect the corresponding connecting rod 197 with the lift motor so that the respective cross belt assembly will be raised. Any belt assembly for which the respective clutch is not actuated is not operatively linked with the lift motor, so that the belt assembly is not raised when the lift motor is actuated.

Although each cross-belt assembly 180 may be connected with the lift motor by a clutch 198, in the present instance the first cross belt assembly 180*a* is connected without a clutch. Therefore, the first cross belt assembly is always raised when the discharge assembly 170 is actuated. In this way, the system lifts the first cross belt assembly 180*a* and one or more of the remaining cross belt assemblies in response to the detection of the document length.

As shown in FIGS. 2, 4 and 5, a reject bin may be positioned at the end of the output conveyor 150. Documents that are not sorted by the sorter 160 to one of the output bins 220*a,b,c* are discharge to the reject bin. In this way, the reject bin 225 operates as a separate sort location. Accordingly, the reject bin may be utilized as a fourth sort location so that the documents may be sorted to one of the four sort locations based on criteria detected during processing of the documents.

Figure 9A:
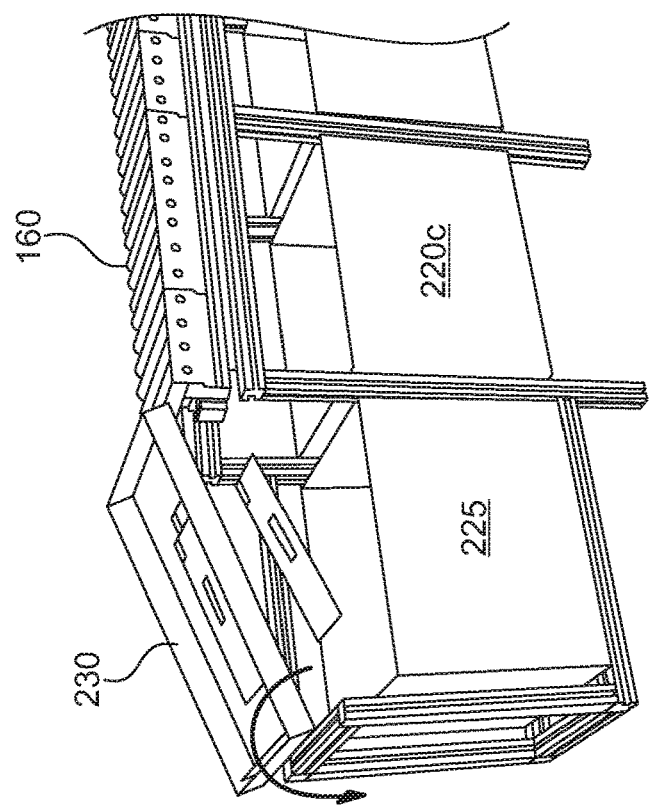
FIG. 9a is a perspective view of an end of the sorting station illustrated in FIG. 2, with a sort tray illustrated in a lower position.
Figure 9B:
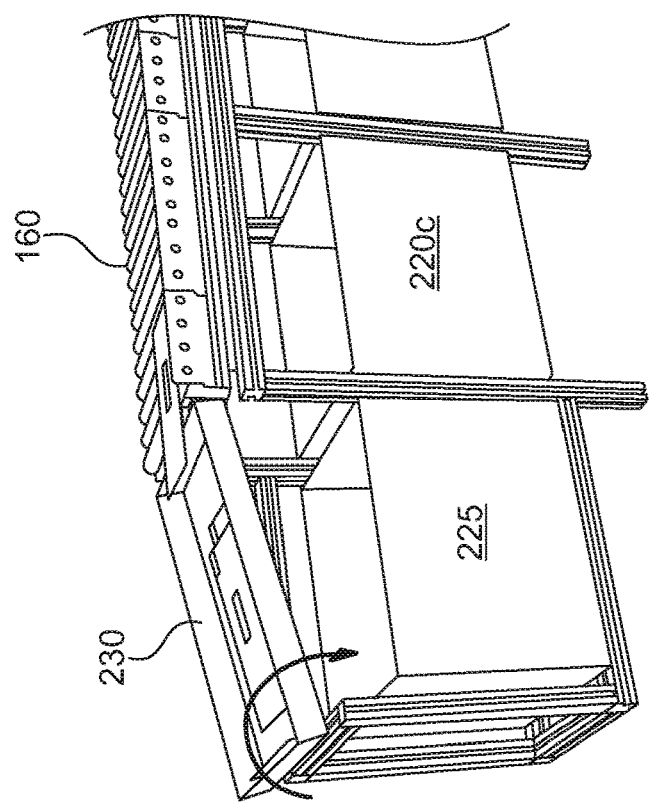
FIG. 9b is a perspective view of the sorting station illustrated in FIG. 9a, with the sort tray illustrated in an upper position.

In the previous discussion, the bin at the end of the conveyor is described as a bin 225 that either receives rejected pieces or operates as a fourth sort location. Alternatively, the end of the output conveyor 150 may be configured to include a low volume tray 230 and a high volume sort bin that is similar to sort bins 220*a,b,c*. Specifically, referring to FIGS. 9*a*-9*b*, the low volume sort tray 230 overlies the bin 225. The tray is a shallow tray that is pivotable between an upper position and a lower position. Referring to FIG. 9*a*, the forward end of the tray 230 is open so that when the tray is pivoted into a downward position the forward edge of the tray is below the upper surface of the output conveyor 160 so that document discharging off the end of the output conveyor fall into the tray. However, as shown in FIG. 9*b*, when the tray 230 is pivoted into an upper position the forward edge of the tray is spaced above the upper surface of the output conveyor 160. In this way, when the tray 230 is in the upper position a gap is formed between the tray 230 and the output conveyor. Documents being discharged from the end of the conveyor fall through the gap and into the large bin 225. The controller controls the operation of the tray to pivot the tray between the upper and lower positions to selectively direct document to either the bin 225 or the tray 230.

Method of Use

The work station 10 and sorting station 100 may be utilized to process a variety of documents using a variety of document work flows. The work station 10 and the sorting station combine to provide alternate work flows that can be utilized for different batches of documents. For instance, a first batch of documents may be a stack of documents in the form of contents that have been extracted from envelopes. For such a job, the operator may input information to the system indicating that the documents for that job are to be scanned by the scanner 60 and sorted to the output bins 70. Alternatively, the operator may input information indicating that the documents in a job are to be processed by the sorting station 100. For such a job, the operator drops each document onto the drop conveyor 40 and the system then conveys each piece to the feeder 50, which feeds the piece to the scanner 60 and discharges the piece through the bypass path 75 to the input conveyor 110 of the sorting station 100.

One method of use sorts the documents based on instructions received on a piece by piece determination. However, the instructions are not provided in real time. Instead, each piece is scanned and the image for the piece is exported to a file server so that the images for the piece can be accessed by a remote user. The user examines the images and provides processing instructions for the different pieces. The pieces are processed during a second pass and each piece is sorted in response to the instructions received for the piece.

For example, a job may include numerous documents in the form of mail pieces, such as envelopes containing contents. The recipient of the mail pieces may desire different mail pieces to be processed differently depending on different criteria. For instance, the recipient may want certain pieces to be discarded, such as junk mail. The recipient may desire a second type of mail piece to be extracted and scanned to obtain image data for the enclosed documents. The original documents can then be discarded without being delivered to the recipient. The recipient may desire a third type of mail to extracted scanned to obtain image data for the enclosed document. For this third type of mail, the recipient desires to also receive the original documents. For a fourth type of mail, the recipient may desire the mail to be delivered without being opened. As can be seen from the foregoing, by identifying how the mail is to be processed, a significant portion of the mail may be able to be processed without the need to be physically delivered to the recipient. Although this can significantly reduce the amount of mail to be delivered, it may require the recipient to identify how each piece of mail is to be processed. To do so, the system may scan each piece during a first pass to obtain image data for each mail piece. The image data for each mail piece is exported to a remote server to await instructions from the recipient. For instance, the system may be configured so that when the recipient views the image for a piece of mail the system prompts the recipient to identify how the mail piece is to be processed (e.g. which of the four mail types is the piece). During a subsequent pass through the sorter, the pieces are sorted according to the instructions received for each piece.

In order to correlate the document images with the actual mail piece it is desirable to identify each mail piece with a unique identification element, such as a number bar code or other marking. When the recipient views the images for a piece, the instructions received for the piece will be correlated with the unique identifier for the piece. In this way, during a subsequent pass the unique identification element can be scanned and then processed in accordance with the instructions received for that identification number.

In view of the foregoing, a method of using the system to process mail may operate as follows. The operator inputs information into the system using the control panel 80 to indicate that the job includes a number of documents to be processed by the sorting station 100. The operator then drops each piece onto the drop conveyor 40. The pieces are conveyed to the feeder 50 which feeds the pieces to the scanner 60 which scans the documents to obtain high resolution image data for each document. The image data is exported to a file server or other remote storage to allow the recipient remote access to the stored image data.

It should be understood that the image processor 90 for the system is operable to process the image data acquired for a document by the scanner 60. In particular, the image processor is operable to process the data to identify and read markings on the document. For instance, the image processor 90 may utilize OCR to identify text, such as the recipients address printed on the document. Similarly, the image processor may identify and read markings such as a bar code. For instance, during a second pass the image processor 90 may scan the image data for a document to identify the identification marking printed on the document by the printing station 130 during the first pass. The identification marking can then be used to control the processing of the document in the sorting station 100 as discussed further below.

From the scanner 60 the piece pieces are conveyed through the bypass path to the input conveyor 110 of the sorting station. The input conveyor 110 conveys each piece to the imaging station 120. The imaging station scans the piece to obtain image data for the piece. The image data may be processed to identify a clear area on the piece where an identification marking can be printed. Although the system may utilize the system imaging processor 90 to process the image data obtained by the camera 125, the imaging station 120 may include a local image processor for processing the image data. The local image processor may be configured to analyze the image data to identify an area sufficiently clear of marking or printing so that a unique identification marking can be applied to the piece. Although a separate imaging station may be provided, it should be understood that the system may operate without a separate imaging station 120. Instead, as noted above, the image data for a document may be obtained by the scanner 60 and the image processor 90 may process the image data during the first pass and during subsequent passes as well. Accordingly, it should be understood that any section of this description that details the processing of the image data may be performed by the image processor 90 associated with scanner 60.

From the imaging station 120, the conveyor conveys the piece to printing station. The imaging station then prints the unique identification marking on the piece in the location where the imaging processor detected a clear zone. Specifically, as described previously, the printing station can control the area on which the marking is printed by controlling the timing of the printing as the document is conveyed past the print head and by controlling which of the print heads 132*a,b* is used to print the marking. Additionally, the print head may be moved across the width of the document in response to the identification of the area where the marking is to be printed.

After the identification mark is printed on the piece, the piece exits the printing station and is conveyed to one of the discharge areas. During this first pass all the pieces can be sorted to a single output area. After the recipient views the images for the scanned pieces and provides instructions, the pieces are processed during a second pass. Specifically, the operator inputs information into the system via the control panel indicating that the job includes a number of pieces to be processed during a second pass. The pieces are dropped on the drop conveyor 40 and conveyed through scanner 60 where the scanner obtain image data for each document and then discharges the documents through the bypass path 75 to the sorting station 100. The system then analyzes the image data for a document to search for and read the identification marking. The system may scan the document using the imaging station 120 and process the imaging data obtained by the imaging station 120. Alternatively, in the present instance, the system imaging processor 90 may process the image data obtained by the scanner 60 during the second pass to attempt to locate and read the identification mark printed on the document by the printing station during the first pass. When the identification number is determined, the instructions received for the piece are retrieved. The sorter then sorts the piece to one of the sort locations 220*a,b,c* based on the instructions received for the piece. However, some of the pieces may not have been viewed by the recipient so the recipient may not have provided instructions for some pieces. Accordingly, pieces for which instructions have not yet been provided are sorted together in one of the sort locations. Alternatively, such pieces may all be discharged to the reject bin 225. The pieces for which instructions had not been received may be processed again at a later time according to a subsequent processing pass that is similar to the second pass described above. This process is repeated until all the pieces in the job are sorted according to the recipient's instructions. However, it may be desirable to limit the number of times that a piece is processed or the time frame for receiving instructions from the recipient. For instance, after five days, pieces for which instructions have not been received are automatically processed as mail to be delivered to the recipient without being opened.

In the foregoing description, the method included the step of analyzing the image data for a piece to identify a clear zone in the form of an area sufficiently free of marking so that an identification marking can be printed on the piece so that the marking can later be scanned. It may be desirable to print the identification in certain areas of the piece. However, it is desirable to identify clear zones if the desired area is not clear. Accordingly, it may be desirable to scan for the clear zone in a manner that prioritizes certain areas of the document. For instance, the system may process the image data to identify blocks of image data that are free from marking. Such blocks may be clear zones. If a clear zone has an area that is larger than the size of the identification marking then the clear zone may be a candidate zone for printing the identification marking. However, the document may include more than one candidate clear zones so that the system may select from among the candidates zones to determine the print zone as discussed further below.

One such method of scanning for clear zone includes the following steps. First, the piece is scanned to obtain optical image data for a document, such as a mail piece. The image processor may then process the image data by binarizing the data as described previously above. The image data for the image may then be separated into a plurality of subsets and each subset may be analyzed. For instance, the image data for a piece may be separated into a plurality of separate segments, each represent a portion of the document. By way of example, the document may be divided into a grid or array of blocks. The image data for the document is segmented into a series of data subsets, each corresponding to one of the blocks in the grid. The image processor analyzes the data in each subset to identify the number of black pixels in the subset. If the number of black pixels in below a threshold, the subset or block is identified as a clear zone. The image processor then analyzes the next subset of image data to determine whether the number of black pixels in the subset is below the number of black pixels in the previously processed subset of image data. If the number of black pixels in the subset is lower than the number of black pixels in the previous subset, then the number of black pixels in the current subset becomes the threshold. Each subset is analyzed in this way and compared against the detected black pixel threshold. When a subsequent subset has a black pixel count below the threshold, the subset is determined to be the clear zone. By analyzing the data in stepwise fashion this way, the number of black pixels in the clear zone will continue to reduce until a subset has zero black pixels or until the clearest area is processed.

The system may also operate so that a subset is identified as the clear zone (i.e. the area where the identification mark is to be printed) if the subset has a count of black pixels that is within a threshold amount of black pixels of the previously determined clear zone. For instance, if the threshold is 10 and a subsequent subset is determined to have 8 more black pixels than the current threshold value, then the subset being processed is identified as a clear zone and the subsequent subset is compared to the number of black pixels in the clear zone.

By way of example, the image data for a piece may be segmented into a series of 54 subsets of data, representing a grid of 6 rows and 9 columns of image data blocks. The clear zone threshold may be initially set at a threshold indicative of the minimum amount a marking that will qualify as a clear zone area. For instance, the clear zone threshold may be initially set at 100. Subset 1 is analyzed and the number of black pixels is identified. For instance, the number of black pixels may equal 75. Therefore, the clear zone threshold is set at 75. The second subset is examined and the number of black pixels is 90. The threshold remains set at 75 and the third subset is examined. The third subset is examined and the number of black pixels is 40. Therefore, the third subset is identified as the clear zone and the threshold is set to 40. The fourth subset is examined and the number of black pixels is also 40. The threshold remains at 40, but subset four is identified as the clear zone. In this way, the methodology weights or prioritizes blocks or data subsets that area processed later.

As described above, the methodology may be used to prioritize or weight the subsets that are processed later. Therefore, certain areas of the documents can be prioritized for clear zones by controlling the order in which the areas of the image data are processed. For example, returning to the example in which the document is segmented into a grid of 54 blocks and the image data is segment into subsets corresponding to such blocks. The data may be analyzed in an order starting with one of the blocks in the middle of the grid, such as row 3, column 3. The segments may be processed in an order that corresponds to moving in a counterclockwise rotation from the original block. In this way, the last blocks to be processed are the blocks corresponding to the trailing edge of the piece and the upper edge of the piece. By analyzing the data in this order, the process prioritizes or weights the trailing edge and the upper edge for the clear zone. Alternatively, the system may priorities certain areas of the document, such as the upper edge or lower edge. The data may be processed so that the systems factors in the location of the clear zone and not just the size of the clear zone. For instance, the system may process the data and identify several portions of the document each of which has a clear zone having an area that is greater than the area required to print the necessary identification marking. Each such clear zone is a candidate clear zone because it has sufficient length and width on which to print the identification marking, such as a bar code. The system may select which clear zone is the zone on which the identification marking is printed (i.e. which candidate zone is the printing zone). For instance, the printing zone need not be the candidate zone with the largest area. Instead, the printing zone may be selected according to a second criteria. For instance, it may be desirable to weight the printing zone toward being in a particular portion of the document. One example may be to weight the printing zone so that the printing zone is toward the bottom of the document. In this way, the candidate zone that is farthest toward the bottom of the document is selected as the print zone. Similarly, it may be desirable to have the print zone toward the leading edge of the document. In such an instance, the system will select the candidate zone closest to the leading edge as the print zone. Further, other criteria can be used to select the print zone from among a plurality of candidate zones. For instance, the print head is moveable, but it may be desirable to minimize movement of the print head. Therefore, it may be desirable to select the print zone so that movement of the print head is minimized. Accordingly, from a plurality of candidate zones the system may select as the print zone the zone that is most closely aligned with the print head.

It will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

The invention claimed is:

1. An apparatus for processing documents, comprising:
   a scanner for scanning documents to obtain image data for the documents;
   a fileserver configured to receive the image data for the documents and store the image data;
   a conveyor for receiving the documents from the scanner, wherein the conveyor is configured to convey documents along a document path without entraining the documents;
   a plurality of output locations configured to receive documents from the conveyor;
   a sorter for sorting documents to the output locations, wherein the sorter comprises:
      a length detector for detecting a characteristic indicative of the length of the documents;
      a first set of ejectors configured to displace documents on the conveyor transverse the document path, wherein ejectors in the first set of ejectors are independently actuable and each of the ejectors in the first set of ejectors is positioned to eject documents toward a first one of the output locations;
      a controller configured to selectively actuate one or more of the ejectors in the first set of ejectors to eject one of the documents based on the detected characteristic that is indicative of the length of the document.

2. The apparatus of claim 1 comprising a displaceable stop operable to selectively stop documents along the document path.

3. The apparatus of claim 2 wherein the displaceable stop is displaceable between a first position in which the stop is positioned below an upper surface of the conveyor and a second position in which the stop is positioned above the upper surface.

4. The apparatus of claim 3 wherein the displaceable stop is positioned adjacent the first set of ejectors.

5. The apparatus of claim 1 wherein each of the ejectors of the first set of ejectors comprises a belt assembly operable to engage documents.

6. The apparatus of claim 1 comprising a second set of ejectors configured similar to the first set of ejectors, wherein the second set of ejectors is spaced from the first set of ejectors and wherein each ejector in the second set of ejectors is configured to displace documents toward a second one of the output bins.

7. The apparatus of claim 6 wherein the controller is configured to selectively operate the first or second set of ejectors to direct documents to the first or second output bin based on criteria other than the detected characteristic that is indicative of the length of the document.

8. An apparatus for processing documents, comprising:
   a conveyor for conveying a document along a document path;
   an imaging station configured to scan the document to obtain image data representative of the document as the document is conveyed along the document path;
   a printer configured to print an identification mark on the document as the document is conveyed along the document path;
   an image processor configured to process the image data to identify one or more candidate clear zones that are sufficiently clear of markings that the identification mark can be printed without overlapping markings on the document,
   wherein if the image processor identifies more than one candidate clear zones, the image processor is configured to select a print zone from among the candidate clear zones based upon a secondary criteria;
   wherein the printer is controlled to print the identification mark in the print zone.

9. The apparatus of claim 8 wherein the secondary criteria is the proximity of the of the candidate clear zone to a select portion of the document.

10. The apparatus of claim 9 wherein the secondary criteria is an edge of the document.

11. The apparatus of claim 8 wherein the secondary criteria is proximity to the location of the print head.

12. The apparatus of claim 8 wherein the image processor is configured to separate the image data for each document into a plurality of subsets of image data and the image processor is configured to analyze each subset of image data to determine a dark pixel count for each subset of image data, wherein the dark pixel count for one of the subsets of image data is the number of pixels in the subset that exceed a darkness threshold.

13. The apparatus of claim 12 wherein the image processor is operable to binarize the image data so that each pixel represents black or white, wherein black pixels exceed the darkness threshold.

14. A method for processing a batch of document, comprising the steps of:
   scanning a batch documents to obtain image data for each document;
   exporting the image data for each document so that a remote operator can provide processing instructions for each document;
   scanning the batch of documents a second time to obtain a second set of image data for each document;
   processing the second set of image data for each document to identify each document;
   after the step of processing the second set of image data for one of the documents in the batch, determining whether instructions for processing each document have been provided by the operator;
   sorting each document based on the instructions provided by the operator for the document or based on the lack of instructions provided by the operator.

15. The method of claim 14 comprising the step of printing a unique identification mark on each document in the batch after the step of scanning each document, wherein the step of processing the second set of image data comprises identifying and reading the unique identifying mark for the document.

16. The method of claim 14 wherein if instructions have not been provided for one or more of the documents the method comprises iteratively processing each document by scanning and sorting such documents until instructions are provided for each such document.

17. The method of claim 16 wherein the step of iteratively processing terminates after a select number of iterations.

18. The method of claim 15 wherein unique identifying mark is a bar code and the steps of scanning the batch of documents a second time to obtain a second set of image data for each document and processing the second set of image date comprise the steps of scanning each document for a bar code and reading the bar code to identify the unique identification mark.

\* \* \* \* \*